June 2, 1953 D. C. ESPLEY 2,640,916

FILTER ARRANGEMENT FOR COMBINED RADIO RECEIVING AND TRANSMITTING SYSTEM

Filed July 13, 1949

INVENTOR
DENNIS CLARK ESPLEY
BY Laurence B. Dodds
ATTORNEY

Patented June 2, 1953 2,640,916

UNITED STATES PATENT OFFICE 2,640,916

FILTER ARRANGEMENT FOR COMBINED RADIO RECEIVING AND TRANSMITTING SYSTEMS

Dennis Clark Espley, North Wembley, England, assignor to The General Electric Company, Limited, London, England Application July 13, 1949, Serial No. 104,471
In Great Britain July 27, 1948

7 Claims. (Cl. 250—13)

Figure 1:
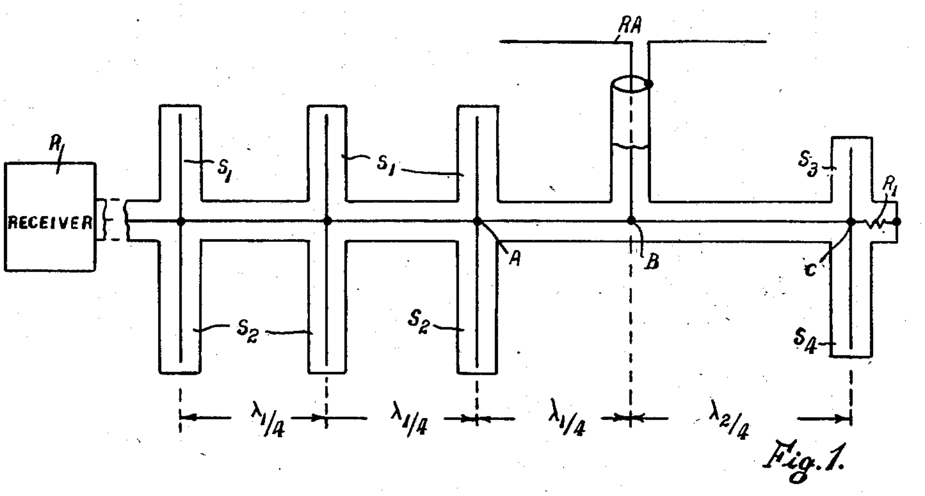

The present invention relates to electric filter systems of the kind in which a source of oscillatory energy within a predetermined desired frequency band is coupled through a filter network to a load, the circuit between the source and the load being substantially matched in this frequency band, whereby energy within the said frequency band is transmitted without substantial attenuation or reflections.

In general, if oscillations in some other band of frequencies enter such a system, matching will no longer exist and reflections will occur.

An example is a combined radio receiving and transmitting system where the said predetermined frequency band is, say, that of transmission, the source being a transmitter and the load a transmitting aerial. The second named frequency band may then be that of reception. Energy in the latter band may enter the transmitting circuits owing to the fact that the transmitting and receiving aerials have often to be so arranged that some cross-fire, that is to say transference of radio frequency energy, can take place between them even though they may be directive in character. For instance the two aerials may be arranged side by side or one above the other at the top of a mast. It is arranged that the impedance of the input circuit of the filter network associated with the transmitter is matched to the impedance of the aerial feeder at the transmitter frequencies but at the receiver frequencies there is a mismatch and consequently any energy at the receiver frequency which may be received by the transmitting aerial may pass along the transmitter feeder to the filter network therein and be reflected at this filter network and radiated from the transmitting aerial. Such energy or part thereof may enter the receiving aerial and thence pass to the receiver delayed in time relatively to the energy reaching the receiver by the direct path. Similarly the receiver aerial feeder is matched to the filter network associated with the receiver at the receiver frequencies, but at transmitter frequencies there is a mismatch with the result that energy reaching the receiver aerial by cross-fire from a transmitter aerial may be reflected at the input to the filter network back to the receiver aerial where it is re-radiated delayed in time relatively to the energy radiated by the transmitting aerial.

The present invention has for its principal object to provide a filter system of the kind set forth in which the reflection at the source or load back to the load or source, respectively, of energy within a frequency band other than that for which the said circuit is matched is prevented or substantially reduced.

A further object of the invention is to provide a combined radio transmitting and receiving system in which the difficulties set forth arising from cross-fire are overcome or substantially reduced.

According to the present invention, a combined radio receiving and transmitting system comprises transmitting and receiving aerials for transmitting at a mean wavelength $\lambda_1$ and for receiving at a mean wavelength $\lambda_2$, respectively, and subject to have cross fire occur between the transmitting and receiving aerials. The system also comprises a first filter network, a transmitter coupled to the transmitting aerial through the first filter network, and a first feeder located between the first filter network and the transmitting aerial in which the impedance presented to a point in the first feeder at the wavelength $\lambda_2$ of the transmitter is substantially infinite. In addition, the system comprises a second filter network, a receiver coupled to the receiving aerial through the second filter network, and a second feeder located between the second filter network and the receiving aerial in which the impedance presented to a point in the second feeder at the wavelength $\lambda_1$ by the receiver is substantially infinite. Additionally, the system comprises a pair of transmission lines of electrical lengths $$a\frac{\lambda_y}{4}$$

individually connected at one end of each thereof, respectively, to the point in the first feeder and to the point in the second feeder and a pair of impedance structuers individually connected, respectively, at the opposite end of each of the transmission lines and having at the wavelength $\lambda_x$ an impedance which is substantially a pure resistance equal to the characteristic impedance of the transmission line and having substantially zero impedance at the wavelength $\lambda_y$, where $a$ is an integer and wavelengths $\lambda_y$ and $\lambda_x$ are, respectively, $\lambda_1$ and $\lambda_2$ when one of the transmission lines is connected to the first feeder and, respectively, $\lambda_2$ and $\lambda_1$ when the other of the transmission lines is connected to the second feeder.

According to a feature of the invention, in a combined radio receiving and transmitting system in which cross-fire may occur between the receiving and transmitting aerials and in which the receiving aerial is coupled through a feeder to the input of a filter network, the output of this network being coupled to the receiver and the circuit between such aerial, and receiver being substantially matched over a desired frequency band to be received, there is connected to the feeder at a point at which the impedance presented by the filter network and receiver is substantially infinite at the mean wavelength $\lambda_1$ of the frequency band to be transmitted, one end of a transmission line of length substantially equal to $a_1\lambda_2/4$, where $\lambda_2$ is the mean wavelength of the frequency band to be received and $a_1$ is an odd integer which may be unity, and the other end of this transmission line is terminated by a structure having at the wavelength $\lambda_1$ an impedance which is substantially a pure resistance equal to the characteristic impedance of the transmission line, and having substantially zero impedance at the wavelength $\lambda_2$.

Further, according to the invention, in a combined radio receiving and transmitting system in which cross-fire may occur between the receiving and transmitting aerials and in which the transmitting aerial is coupled through a feeder to the input of a filter network, the output of this network being coupled to the transmitter and the circuit between such aerial and transmitter being substantially matched over a desired frequency band to be transmitted, there is connected to the feeder at a point at which the impedance presented by the filter network and transmitter is substantially infinite at the mean wavelength $\lambda_2$ of the frequency band to be received, one end of a transmission line of length substantially equal to $a_2\lambda_1/4$, where $a_2$ is an odd integer which may be unity and the other end of this transmission line is terminated by a structure having at the mean wavelength $\lambda_2$ of the frequency band to be received an impedance which is substantially a pure resistance equal to the characteristic impedance of the said transmission line, and having substantially zero impedance at the wavelength $\lambda_1$.

Figure 2:
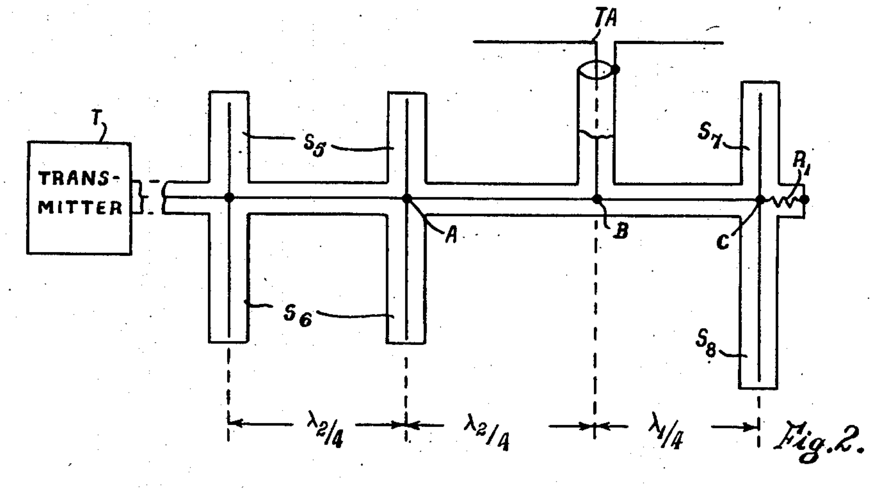

The invention will be described by way of example with reference to the accompanying drawing in which Figure 1 is a diagram illustrating an arrangement according to the invention as applied to a receiver of a combined receiving and transmitting system and Figure 2 shows a similar arrangement for a transmitter in such a system. In the particular form of the invention to be described the filter networks are in the form of one or more pairs of stubs. Other suitable networks, including those employing single stubs, may of course be used.

Referring to Figure 1, a filter network presenting a very high impedance to the transmitter wavelength $\lambda_1/4$ comprises three pairs of stubs $S_1$ and $S_2$ spaced apart by $a\lambda_1/4$, where $a$ is an odd integer; in the example it is unity. A receiver R is connected to one end of the network and a receiving aerial RA is connected to a point B on the network. The stubs $S_1$ and $S_2$ are so designed that the impedance at A looking towards the receiver is substantially zero at the transmitter wavelength $\lambda_1$, whilst there is a matched termination at the receiver wavelength $\lambda_2$.

For this purpose, the stubs $S_1$ (say) have an electrical length equal to $b\lambda_1/4$, where $b$ is an odd integer (it is an even integer if a short-circuited stub is used) and the stubs $S_2$ have an electrical length such that at the wavelength $\lambda_2$ their reactance is substantially equal in magnitude but opposite in sign to that of the stubs $S_1$. More than two stubs may be used in place of each pair of stubs $S_1S_2$ provided that one of these stubs has the value specified for $S_1$ and that the lengths of the other stubs are so chosen that the resultant reactance of all the stubs in parallel is substantially infinite at the wavelength $\lambda_2$.

At the point B which is spaced from the point A by $\lambda_1/4$, the impedance looking toward A will therefore be substantially infinite at the wavelength $\lambda_1$. Consequently negligible energy at the transmitter wavelength $\lambda_1$ can pass from the aerial RA to the receiver R. On the other hand, so far as the path RA, B, R is concerned, there is a mismatch at the point B at the transmitter frequency and energy would be reflected back toward the aerial RA. In order to prevent this there is connected to the point B a length of feeder equal to $\lambda_2/4$ and at the end C of this feeder there is connected a further pair of stubs $S_3$ and $S_4$ so designed that their impedance at a wavelength $\lambda_1$ is substantially infinite. Thus stubs $S_3$ and $S_4$ may have electrical lengths such that at the wavelength $\lambda_1$, their reactances are substantially equal in magnitude but opposite in sign, whilst one of the stubs, say $S_3$, has an electrical length substantially equal to $b_1\lambda_2/4$ (for an open-circuited stub) where $b_1$ has the same significance as that given to $b$. More than two parallel-connected stubs may be connected at the point C provided that one has the value specified for $S_3$ and that the lengths of the other stubs are such that the resultant reactance of all the stubs in parallel is substantially infinite at the wavelength $\lambda_1$. The point C is connected to the outer of the feeder systems through a resistor $R_1$ having a resistance equal to the characteristic impedance of the feeder connecting points B and C. An impedance transformation can be used between B and C if desired.

The effect of the arrangement is therefore as follows. For energy at the receiver wavelength $\lambda_2$ reaching the point B from the aerial, there is correct matching looking to the left toward the receiver R whilst to the right the impedance is substantially infinite since at the point C the impedance at this wavelength is substantially zero and the separation between points B and C is equal to $\lambda_2/4$. There is therefore correct matching at the receiver wavelength at point B and no reflection at this wavelength. At the transmitter wavelength $\lambda_1$ there is at the point B substantially infinite impedance looking to the left toward the receiver R whilst to the right the stubs $S_3$ and $S_4$ present a substantially infinite impedance so that the line is terminated at this end by the resistance $R_1$. There is consequently a match at the transmitter wavelength and no reflection at this wavelength.

Referring to Figure 2, this closely resembles the arrangement of Figure 1, one end being connected to a transmitted T and the point B being connected to the transmitting aerial TA. The filter network between the aerial and the transmitter is in this case constituted by two pairs of stubs $S_5$ and $S_6$ (though any desired number of pairs may, of course, be used) the separation in this case being $\lambda_2/4$, where $\lambda_2$ is again the mean receiver wavelength which in this case is undesired. The separation between points B and C in this case is made equal to $\lambda_1/4$ and the pair of stubs connected at point C are marked $S_7$ and $S_8$. In this case the stubs $S_5$ have an electrical length equal to $b\lambda_2/4$ and the stubs $S_6$ have such electrical length that at $\lambda_1$ their reactance is substantially equal in magnitude but opposite in sign to that of the stubs $S_5$. The stubs $S_7$ and $S_8$ have electrical lengths such that at $\lambda_2$ their reactances are substantially equal in magnitude but opposite in sign and one of them has an electrical length substantially equal to $b_1\lambda_1 4$. The quantities $b$ and $b_1$ have the same significance as that previously given. As before, the pairs of stubs $S_5$, $S_6$ and $S_7$, $S_8$ may each be replaced by more than two parallel-connected stubs. In this case, at the transmitter wave-length $\lambda_1$, at the point B there is matching between the aerial feeder and the network looking to the left toward the transmitter T, whilst to the right the impedance presented is substantially infinite. At the receiver wave-length $\lambda_2$ the impedance looking to the left from the point B is substantially infinite and that looking to the right is substantially the resistance of $R_1$. Consequently no reflection of energy at the receiver wavelength takes place at the point B.

It will be understood that in Figure 1 structures other than $S_3$, $S_4$, $R_1$ may be used at the point C. For instance there could be used a structure such as that to the left of point A in Figure 2 and having instead of the transmitter a resistance element providing a matched termination. Similarly the structure connected at C in Figure 2 may take many other forms, one of which is a structure such as that to the left of point A in Figure 1, with the receiver replaced by a resistance element providing a matched termination.

I claim:

1. In a combined radio receiving and transmitting system including transmitting and receiving aerials for transmitting at a mean wavelength $\lambda_1$ and receiving at a mean wavelength $\lambda_2$ respectively, and subject to have cross fire occur between said transmitting and receiving aerials, a receiver apparatus comprising: a receiver; a filter network coupled to said receiver; a feeder coupled between said filter network and said receiving aerial and in which the impedance presented to a point in said feeder at the wavelength $\lambda_1$ by said receiver is substantially infinite; a transmission line of electrical-length substantially equal to $a\lambda_2/4$, where a is an integer which may be unity, connected at one end to said point in said feeder; and an impedance structure connected at the other end of said transmission line and including a pair of stubs of such physical size and position with respect to said point and to each other that said structure has at said wavelength $\lambda_1$ an impedance which is substantially a pure resistance equal to the characteristic impedance of said transmission line and has substantially zero impedance at the said wavelength $\lambda_2$.

2. An apparatus according to claim 1, wherein said impedance structure comprises a terminating resistance for said transmission line and a plurality of parallel-connected stubs connected to said transmission line, one of these stubs having an electrical length substantially equal to $b\lambda_2/4$, where $b$ is an integer which is odd when said stub is open-circuited and even when said stub is short-circuited, and the resultant parallel reactance of all said stubs being substantially infinite at the wavelength $\lambda_1$.

3. An apparatus according to claim 1, wherein said filter network comprises a second transmission line provided with a plurality of sets of stubs, the set nearest said point being spaced $\lambda_1/4$ therefrom and the sets being spaced apart along said second transmission line by $\lambda_1/4$, each set comprising a plurality of stubs of which one has an electrical length substantially equal to $b_1\lambda_1/4$, where $b_1$ is an integer which is odd when said stub is open-circuited and even when said stub is short-circuited, and the resultant reactance in parallel of all the stubs of each of said sets being substantially infinite at the wavelength $\lambda_2$.

4. In a combined radio receiving and transmitting system including transmitting and receiving aerials for transmitting at a mean wavelength $\lambda_1$ and receiving at a mean wavelength $\lambda_2$ respectively, and subject to have cross fire occur between said transmitting and receiving aerials, a transmitter apparatus comprising: a transmitter; a filter network coupled to said transmitter; a feeder coupled between said filter network and said transmitting aerial and in which the impedance presented to a point in said feeder at the wavelength $\lambda_2$ by said transmitter is substantially infinite; a transmission line of electrical length substantially equal to $a\lambda_1/4$, where $a$ is an integer which may be unity, connected at one end to said point in said feeder; and an impedance structure connected at the other end of said transmission line and including a pair of stubs of such physical size and position with respect to said point and to each other that said structure has at said wavelength $\lambda_2$ an impedance which is substantially a pure resistance equal to the characteristic impedance of said transmission line and has substantially zero impedance at the said wavelength $\lambda_1$.

5. An apparatus according to claim 4, wherein said impedance structure comprises a terminating resistance for said transmission line and a plurality of parallel-connected stubs connected to said transmission line, one of these stubs having an electrical length substantially equal to $b\lambda_1/4$, where $b$ is an integer which is odd when said stub is open-circuited and even when said stub is short-circuited, and the resultant parallel reactance of all said stubs being substantially infinite at the wavelength $\lambda_2$.

6. An apparatus according to claim 4, wherein said filter network comprises a second transmission line provided with a plurality of sets of stubs, the set nearest said point being spaced $\lambda_2/4$ therefrom and the sets being spaced apart by $\lambda_2/4$, each set comprising a plurality of stubs of which one has an electrical length substantially equal to $b\lambda_2/4$, where $b_1$ is an integer which is odd when said stub is open-circuited and even when said stub is short-circuited and the resultant reactance in parallel of all the stubs of each of said sets is substantially infinite at the wavelength $\lambda_1$.

7. A combined radio receiving and transmitting system comprising: transmitting and receiving aerials for transmitting at a mean wavelength $\lambda_1$ and for receiving at a mean wavelength $\lambda_2$, respectively, and subject to have cross fire occur between the transmitting and receiving aerials; a first filter network; a transmitter coupled to said transmitting aerial through said first filter network; a first feeder located between said first filter network and said transmitting aerial in which the impedance presented to a point in said first feeder at the wavelength $\lambda_2$ of said transmitter is substantially infinite; a second filter network; a receiver coupled to said receiving aerial through said second filter network; a second feeder located between said second filter network and said receiver aerial in which the impedance presented to a point in said second feeder at the wavelength $\lambda_1$ by said receiver is substantially infinite; and a pair of transmission lines of electrical lengths $$a\frac{\lambda_y}{4}$$

individually connected at one end of each thereof, respectively, to said point in said first feeder and to said point in said second feeder; a pair of impedance structures individually connected, respectively, at the opposite end of each of said transmission lines and having at the wavelength $\lambda_x$ an impedance which is substantially a pure resistance equal to the characteristic impedance of said transmission line and having substantially zero impedance at said wavelength $\lambda_y$, where $a$ is an integer and wavelengths $\lambda_y$ and $\lambda_x$ are respectively $\lambda_1$ and $\lambda_2$ when one of said transmission lines is connected to said first feeder and respectively $\lambda_2$ and $\lambda_1$ when the other of said transmission lines is connected to said second feeder.

DENNIS CLARK ESPLEY.

References Cited in the file of this patent

UNITED STATES PATENTS

| Number | Name | Date |
|---|---|---|
| 2,401,717 | Wolff et al. | June 4, 1946 |
| 2,412,315 | Brown | Dec. 10, 1946 |
| 2,425,379 | Lindenblad | Aug. 12, 1947 |
| 2,485,606 | Kandoian | Oct. 25, 1949 |
| 2,495,589 | Masters | Jan. 24, 1950 |
| 2,512,673 | Page | June 27, 1950 |